Figure 1:
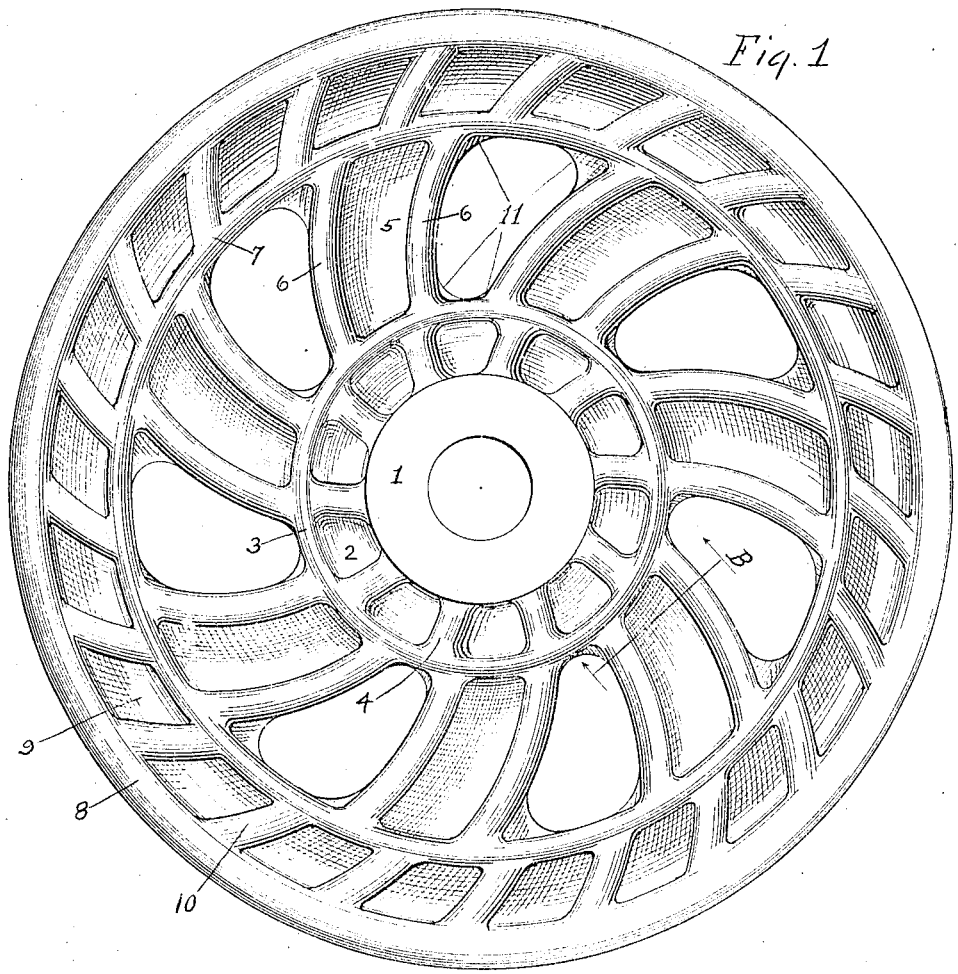

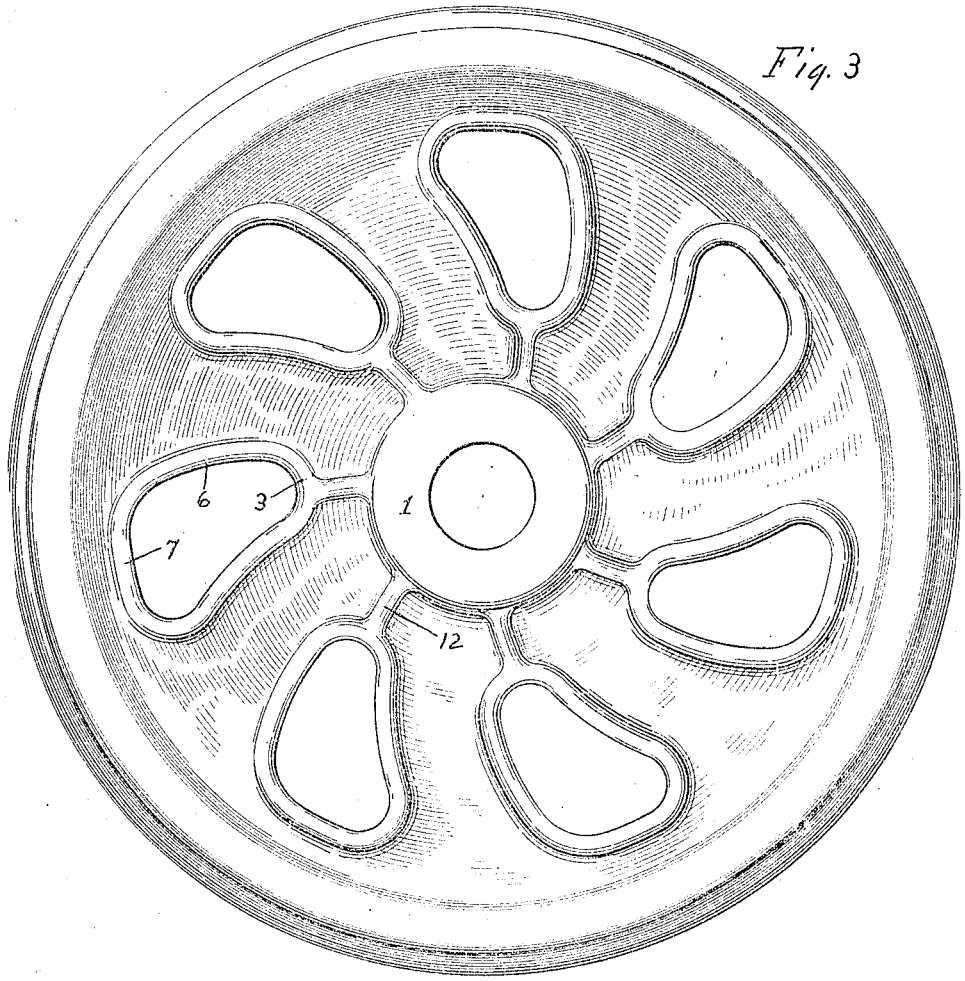

UNITED STATES PATENT OFFICE.

FREDERICK K. VIAL, OF LA GRANGE, ILLINOIS.

CAR-WHEEL.

No. 904,162.		Specification of Letters Patent.		Patented Nov. 17, 1908.

Application filed August 11, 1908. Serial No. 447,979.

*To all whom it may concern:*

Be it known that I, FREDERICK K. VIAL, a citizen of the United States, residing at La Grange, in the county of Cook and State of Illinois, have invented certain new and useful Improvements in Car-Wheels, of which the following is a specification.

The object of my invention is to construct a car wheel, more particularly adapted for street railway use, in which the metal shall be so distributed as to form a tread section of great strength while at the same time avoiding the massing of a large body of metal in the tread, thereby interfering with the chilling operation.

As is well-known car wheels may be made of sufficient strength by providing them with thick tread sections, but such thick sections are hard to chill, and when used the difficulty in chilling must be overcome by using a comparatively hard metal. While the use of hard metal results, together with the chilling operation, in producing a tread of the necessary degree of hardness, the use of such metal results in introducing other weaknesses for the reason that the hard metal is too brittle to impart sufficient toughness to the spokes.

In my improved design of wheel I secure the requisite strength in the tread section not by unduly thickening that section, but by providing a thickened reinforcing rib extending around the wheel at the outer ends of the spokes and some distance inside of the tread, such reinforcing rib being connected by transverse thickened portions or ribs with the tread section. By this means I avoid the massing of a large body of metal in the tread section and provide a wheel in which the thickness of metal in any one place is such that the chilling operation is not interfered with by the rapid flow of heat into the part to be chilled from other parts of the wheel. In my improved wheel, therefore, I am enabled to use a comparatively soft mixture by reason of the fact that the design of the wheel renders it possible to properly chill the tread when a soft mixture is used and obviates the necessity of relying to so great an extent as heretofore upon the initial hardness of the mixture used. The use of a soft mixture results in imparting great toughness to the spokes and interior of the wheel, whereby I am enabled to produce a wheel having its tread section possessing a high degree of resistance to the wear to which it is subjected and at the same time having tough spokes as distinguished from the brittle spokes which result from the use of hard metal. An interior or central strengthening rib extending around the wheel at the inner ends of the spokes may also be provided, if desired, although this feature is not indispensable and the claims of my invention are not limited thereto, except in those instances where such central rib is particularly specified.

The exterior strengthening rib reinforces the wheel against the heavy internal stresses developed by the friction of the brakes, and not only results in strengthening the wheel in this manner, but also strengthens the spokes by decreasing their length without introducing a substantially greater amount of metal into the wheel. Furthermore, the avoiding of a large mass of metal in the tread and the more uniform distribution of the metal throughout the wheel results in more uniform cooling, thereby obviating one of the principal causes leading to the formation of initial internal stresses.

Where a second interior or central strengthening rib is used, it is so placed that a channel is formed around the hub. Where used, such a strengthening rib reinforces the hub against bursting when pressed on an axle, and it permits proper spacing of the inside ends of the spokes, thereby avoiding sharp corners which are difficult to mold, and leads to a further shortening and consequent strengthening of the spokes.

The interior strengthening rib is preferably connected to the hub by means of transverse or substantially radial strengthening ribs. In a wheel so formed the metal may be effectively distributed by reason of the fact that the number of transverse or substantially radial strengthening ribs may be increased from the center of the wheel outwards. Beginning with the proper number of such ribs between the hub and central strengthening rib this number may be increased in the form of spokes between the central and exterior strengthening ribs, and the spokes themselves, as illustrated, may be formed of a central web reinforced by strengthening ribs. The number of transverse or substantially radial strengthening ribs between the outer strengthening rib and the tread section may again be increased, thus securing the most advantageous distribution of the metal used.

Figure 2:
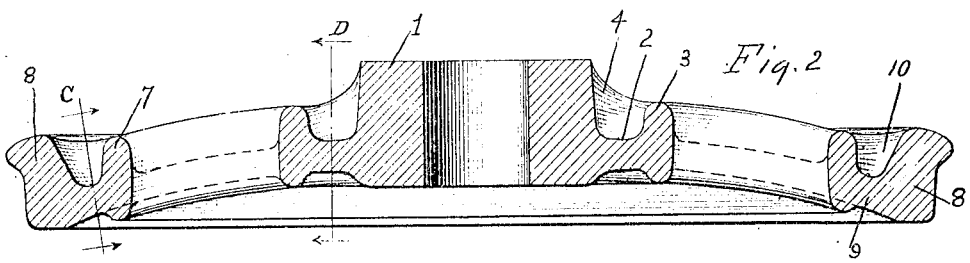

In the drawings—Figure 1 is a side elevation of a wheel constructed according to my invention. Fig. 2 is a central transverse section. Fig. 3 is an elevation of the reverse side of the wheel. Fig. 4 is a section on the line B of Fig. 1. Fig. 5 is a section on the line C of Fig. 2. Fig. 6 is a section on the line D of Fig. 2.

The hub 1 of the wheel is surrounded by a web 2, the outer edge of which is thickened at 3 forming a central or interior strengthening rib extending around the wheel. The web 2 is also formed with thickened parts 4 extending between the hub and the strengthening rib 3. Extending outwardly from the strengthening rib 3 are the spokes. In the present instance I have shown each of the spokes as consisting of a central web 5 provided at each edge with a thickened strengthening rib 6. Extending around the outer ends of the spokes is the outside strengthening rib 7, connected with the tread 8 by the web 9. Extending between the rib 7 and the tread 8 are the transverse strengthening ribs 10. In the present instance I have also shown small webs 11 filling the corners between the spokes and the outside and interior strengthening ribs. It will be understood that the interior strengthening rib may be dispensed with, if desired, and that the special cross section of the spokes shown is not indispensable to the use of my invention.

Considered in one aspect the specific form of my improved wheel illustrated in the drawings may be considered as made up of a hub and tread section connected by a web, said web having an annular series of openings, together with thickened portions or strengthening ribs extending around the wheel at the inner and outer extremities of these openings, and also transverse or substantially radial strengthening ribs connecting the hub with the central strengthening rib, connecting the central strengthening rib with the outside strengthening rib and connecting the latter with the tread section, the number of such transverse or substantially radial strengthening ribs growing larger in each of the series mentioned in the order referred to. If desired, the various strengthening ribs referred to may project on each side of the wheel as illustrated in Fig. 3 in the case of the strengthening ribs 6 of the spokes and in the case of the inner and outer strengthening ribs 3 and 7 which are shown upon the reverse side of the wheel as extending across the interstices between the spokes.

In Fig. 3 I have also shown strengthening ribs 12 extending from the hub to the central part of each of the openings between the spokes. Considerable latitude, however, may be exercised in this matter without departing from the spirit of my invention and the strengthening ribs may be located wholly upon either side of the wheel or partially upon one side and partially upon the other. While I have shown the ribs 3 and 7 as circular in form, which is the preferred shape, it is obvious that they may take other forms without departing from the spirit of my invention.

The invention herein described is in its broadest aspect set forth and claimed in my prior patent No. 869,671, granted October 29, 1907. The specific form of the invention described in this application is more particularly adapted for lighter wheels such as street car wheels, and the claims herein have been drawn to cover such a structure.

I claim:

1. A car wheel comprising a hub, spokes, a strengthening rib extending around the outer ends of the spokes, a tread section, a web connecting said strengthening rib and tread, said web being formed with a plurality of thickened portions or ribs extending between said first mentioned strengthening rib and said tread.

2. A car wheel comprising a hub, spokes, a circular strengthening rib extending around the outer ends of the spokes, a tread section, a web connecting said strengthening rib and tread, said web being formed with a plurality of thickened portions or ribs extending between said first mentioned strengthening rib and said tread.

3. A car wheel comprising a hub, spokes, a strengthening rib extending around the outer ends of the spokes, a tread section, a web connecting said strengthening rib and tread, said web being formed with a plurality of thickened portions or ribs extending between said first mentioned strengthening rib and said tread, each of said spokes comprising a central web and thickened portions or ribs at each edge thereof.

4. A car wheel comprising a hub, a web extending outwardly from said hub, the outer part of said web being thickened to form a central strengthening rib, spokes extending outwardly from said central strengthening rib, a tread section, a web extending from said spokes to said tread section, a thickened outer strengthening rib extending around the outer ends of said spokes and at the inner edge of said last named web, and thickened ribs in said web and extending between said outer strengthening rib and said tread section.

5. A car wheel comprising a hub, a tread section, web sections between said hub and tread section, substantially circular thickened portions extending around the wheel in said web sections, and other thickened portions or transverse ribs extending between said hub and circular ribs and tread section, the number of said transverse ribs increasing toward the outside of the wheel.

In testimony whereof, I have subscribed my name.

FREDERICK K. VIAL.

Witnesses:
WALTER A. SCOTT,
EDYTHE M. ANDERSON.